(12) United States Patent
Stark

(10) Patent No.: US 6,870,676 B2
(45) Date of Patent: Mar. 22, 2005

(54) LAYERED MICRO OPTICS POLARIZATION CONVERTER

(75) Inventor: Daniel L Stark, San Jose, CA (US)

(73) Assignee: Daniel Lee Stark, San Jose, CA (US)

( * ) Notice: Subject to any disclaimer, the term of this patent is extended or adjusted under 35 U.S.C. 154(b) by 93 days.

(21) Appl. No.: 10/351,659

(22) Filed: Jan. 27, 2003

(65) Prior Publication Data

US 2004/0145807 A1 Jul. 29, 2004

(51) Int. Cl.$^7$ .............................. G02B 5/30
(52) U.S. Cl. .................. 359/485; 359/494; 359/500
(58) Field of Search ........................ 359/483, 485, 359/487, 494, 495, 500

(56) References Cited

U.S. PATENT DOCUMENTS

| | | | |
|---|---|---|---|
| 2,270,535 A | * 1/1942 | Land et al. | 362/19 |
| 2,403,731 A | 7/1946 | MacNeille | |
| 2,868,076 A | * 1/1959 | Geffcken et al. | 359/487 |
| 3,998,524 A | 12/1976 | Hubby, Jr. et al. | |
| 5,157,526 A | * 10/1992 | Kondo et al. | 359/487 |
| 5,884,491 A | 3/1999 | Kim et al. | |
| 6,373,630 B1 | 4/2002 | Lee et al. | |
| 6,542,298 B1 | * 4/2003 | Aoki | 359/483 |

FOREIGN PATENT DOCUMENTS

JP 01-265206 A1 * 10/1989

OTHER PUBLICATIONS

Halliday and Resnick /John Wiley & Sons/1061–1063 Physics for Students of Science and Engineering pp. 1061–1063/ 3rd Printing 1963 Printed in USA John Wiley & Sons, Inc.
H. A. MacLeod /Thin Film Optical Filters 3rd Edition/ pp. 362–366/ Institute of Physics Publishing Bristol and Philadelphia/ 1986, 2001/ Printed UK.
Oleg Jefimenko/ Electricity and Magnetism/ New York Appleton Century–Crofts/ pp. 541–547/ Copyright 1966.

* cited by examiner

Primary Examiner—John Juba, Jr.

(57) ABSTRACT

Disclosed is an electro magnetic radiation polarization converter, available in various combinations of the embodiments features, used to convert non polarized radiation into a single polarization state, which may be utilized in many devices requiring polarized radiation. Disclosed is a unique geometric configuration and positing of optic layers that cause polarization separation by reflection and polarization conversion utilizing birefringent materials as well as phase retardation materials to convert incident radiation to a linear or elliptical polarization.

13 Claims, 11 Drawing Sheets

LAYERED MICRO OPTICS POLARIZATION CONVERTER

STATEMENT REGARDING FEDERALLY SPONSORED RESEARCH AND DEVELOPMENT

All research and development associated with this invention has been performed using private funds. No federally sponsored research or development has been used.

BACKGROUND OF THE INVENTION

1. Field of Invention

The present invention relates generally to electromagnetic radiation polarization devices and particularly to conversion of electromagnetic radiation to linear, elliptical, or circular polarization.

2. Description of Related Art

Unpolarized light is described by random orientation of the electric field vector perpendicular to the radiation direction of travel, and corresponding magnetic field vector orthogonal to both the direction of travel and the electric field vector. Linear polarized light is characterized by a spatially constant orientation of the electric field vector and corresponding constant scalar magnitude. Elliptically polarized light is characterized by a rotating electric field vector orientation as observed along the direction of travel and varying scalar electric field magnitude dependent on electric field vector orientation. Circular polarized light is a special case of elliptically polarized light in which the electric field scalar magnitude remains constant.

The early art separates unpolarized electro magnetic radiation into polarized components. Historically a method to separate linearly polarized light was by applying Malus's law. Malus discovered in 1809 that light could be partially or completely polarized by reflection, as described by Halladay Resnick, "Physics For Students of Science and Engineering," pages 1061–1062. FIG. 1 shows graphs of the transmission and reflection coefficients separating unpolarized electro magnetic radiation into the two orthogonally linearly polarized components versus incident angle as measured from a reference orthogonal to the surface. The equations are presented by Jefimenko, "Electricity and Magnetism," pages 546 to 547. In FIG. 1 the reflection coefficient, 200, and transmission coefficient, 201, are polarized with the electric field vector at an angle to the incident surface. The reflection coefficient, 300, and transmission coefficient, 301, are polarized with the electric field vector parallel to the incident surface. Brewster's angle, 500, is the critical incident angle in which all of one polarization is refracted. Brewsters plates take advantage of the full transmission of the orthogonal component by selectively reflecting the vector component parallel to the surface, and transmitting the vector component at an angle to the incident surface. U.S. Pat. No. 2,403,731 provides a classical early prism utilizing the multiple plates set at Brewsters angle, referred to as the MacNeille prism, shown in FIG. 2. MacNeille used seven layers of alternating high and low indices of refraction materials oriented to satisfy Brewsters angle to separate incident unpolarized light to a resultant linearly polarized light. The MacNeille prism further provides for the incident and exiting light to be normal to the prism's surface. Reference H Angus Macleod, "Thin Film Optical Filters," pages 362 to 366.

Another historical method to separate and produce linearly polarized light has been to use birefringent materials such as calcite. Birefringent materials at particular orientations exhibit differing indices of refraction, causing light transmitting through the crystal to be separated into two mutually perpendicular linearly polarized electric field vectors at different velocities and different refraction angles. The birefringent properties are utilized in U.S. Pat. No. 3,998,524 which provides a good background and describes several prism types. One type of separator utilizes a polarization prism that also applies Brewsters law, and polarizes the incident light by total internal reflection of one of the two electric field vectors of the incident light at an interior surface, which is canted to the incident light at or beyond a selected critical angle. A second type utilizes a polarization prism, which transmits both electric field components of the incident light while physically separating them from each other at the output of the polarization prism in accordance to Snells refraction law.

Some applications require separating the two orthogonally polarized electromagnetic radiations. One widely used technique for implementing this type of polarization prism is to cut one or more calcite crystals to form a Nicol or a Glan Thompson type prism. The resultant prism parts are then cemented together with an appropriate index of refraction adhesive. Another implementation of the calcite polarizer is to cement a layer of calcite or birefringent material between two glass prisms.

Other types of birefringent polarization prisms are the Wollaston and Rochon shearing polarizers. The polarizers produce two plane polarized, orthogonal, radiation paths with an angular separation between them at the same output surface of the polarization prism. In addition, the Wollaston polarizer disperses both polarizations of the incident light, and the Rochon polarizer yields only one half the angular separation of the polarized light beams of the Wollaston polarizer.

U.S. Pat. No. 2,270,535 Edwin Land, et al disclose a polarization converter comprised of a pluarity of alternating layers where one layer is isotropic and the other alternating layer is birefringent. Furthermore the index of refractions and orientaton of the birefringent layer is so selected that the index of refraction for the isotropic layer and birefringent layer is the same for electromagnetic radiation of a particular linear polarization, allowing the polarization to transit thru both layers of the optics without a polarization or direction change. Whereas the index of refraction for the orthogonal polarization upon transiting the isotropic fully refracted at the interface and channeled down the isotropic layer. The output is two linear orthogonal polarizations transmitted at different exit angles. Land further positions a phase rotator array to modify the polarization of one of the exit rays to match the other. Disadvantage of this approach is the theoretical maximum of 75% for a narrow passband of the radiation which can be converted to like linear polarization. A further disadvantage is that the optic requires precise angular positioning of the birefringent layer with respect to input radiation. A further disadvantage is the exact requirements for the angular positioning and birefringent properties, dramatically restricting the choice of materials. Similarly material selection of both layers is inhibited by the requirement that both layers exhibit the same index of refraction for the selected polarization. The design also invokes use of Brewster's law which restricts the dynamic of the conversion process both in bandwidth and overall conversion efficiency.

U.S. Pat. No. 2,868,076 W Gerfcken, et al discloses a polarization converter utilizing a plurality of alternating layers where in one layer exhibits a high index of refraction relative to the second layer. The layers are angled relative to the incident radiation so that Brewster's law is satisfied where 100% of the incident radiation of a particular linear polarization is reflected from the interface between layers 1 and 2 and directed to exit the optic. The orthogonal polarization refracts at the layer's interface and is directed to a double refractive foil causing a half wavelength phase shift. The polarizations exiting the optics both match. The disadvantage of this optic is the complexity of structures and high mechanical tolerance demands. Further the optic is designed to operate at Brewsters's angle, which restricts the bandwidth and total conversion efficiency. A further disadvantage is that the double refractive foil must be constructed to a precise thickness and relative orientation in order to rotate the incident light vector exactly half wavelength.

U.S. Pat. No. 5,157,526 Kondo, et al discloses a polarization converter utilizing a plurality of alternating layers where in one layer exhibits a high index of refraction relative to the second layer. The polarization converter efficiency is stated as 1.4 better than conventional, 40%, which is only improvement to 60% conversion. The layers are angled relative to the incident radiation so that Brewster's law is satisfied where 100% of the incident radiation of a particular linear polarization is reflected from the interface between layers 1 and 2 and channeled down layer 1. The orthogonal polarization by Brewster's law is 100% transmitted into the second layer. The second layer is selected to be of birefringent material of a thickness along the ray trace to cause a half wavelength electric field rotation exactly half wavelength. Thus half of the exiting radiation's polarization agrees with the radiation channeled down the first layer. Disadvantages of this invention are that the maximum theoretical efficiency for one interaction is 75% at a narrow passband and the conditions of Brewster's law must be satisfied. A further disadvantage is that both alternating layers are selected to be birefringent materials, restricting the material selection. A disadvantage is that the birefringent layer must be constructed to a precise thickness and positioned to an exact orientation in order to rotate the incident light vector exactly half wavelength. The precision fabrication requirements drive up assembly costs and restrict the selection of materials. FIG. 4 in U.S. Pat. No. 5,157,526 Kondo, et al shows two reflections, but the design uses a single pass of the radiation's electric vector rotation which automatically restricts maximum efficiency to 75%.

SEIKO EPSON (JP 01-265206) discloses a optic of isotropic and birefringent materials where the a birefringent layer causes the unpolarized input radiation to be split into two components at diverging angles, and focused via a micro-lens array onto an array of focus spots with mutually orthogonal linear polarization. Because the incoming radiation has different incoming angle onto the micro lens array, the lens produces an array of focus spots that are alternately orthogonal polarizations. A micro-array of phase shifting plates is positioned to rotate a set of focus points with like linear polarization to match the linear polarization of the other set. The main disadvantage of this approach is the complex high tolerance arrays which drive fabrication costs up. The lens array is best produced by casting a polymer, which restricts the applications. The maximum theoretical efficiency is only 75%.

Other polarization schemes that strive to convert the entire incident electromagnetic radiation into a single polarization have been referred to as doublers. U.S. Pat. No. 6,373,630 describes the most recent improved polarization doubler. A polarization splitter film and a phase retardation film are used to focus and refract the incident radiation with an under plate. The radiation transiting the under plate, goes through a series of optical processes of polarization splitting, reflection, total reflection, phase retardation, and subsequently becomes radiation of a single polarization state output. A major disadvantage is a complex micro optic structure requiring precision manufacture which results in a high manufacturing cost. The complex micro optic is best produced from a cast or plastic material, which limits the application capabilities. The doubler is only targeted for use with LCD projectors, and does not provide a generalized design for other applications such as automobile headlight blinding prevention where the headlight output radiation is linearly polarized at 45 degrees from vertical in order to allow polarization discrimination by oncoming drivers or pedestrians viewing through a similarly polarized film. The design does not lend itself well to miniaturization, required in the fiber optics applications.

U.S. Pat. No. 5,884,991 is referenced because of its mention of birefringent cement.

SUMMARY OF THE INVENTION

The first object of the present invention is to provide a wide band electromagnetic radiation polarization converter to convert said radiation into a desired polarization state, and to convert the radiation at high efficiencies. To achieve polarization conversion, this invention provides a micro optical component constructed in a plurality of layers with the layer materials selected for their optical properties. The input and output optic major apertures are the sum of the micro-optic apertures constituting the edges of the layers. The layered micro optical components utilize in combination or singularly the advantageous properties of: birefringent materials, Snell's law of diffraction and Malus's discovery that light can be polarized by reflection. This invention offers wide band polarization conversion with efficiencies greater than 80% for wide bandwidths and higher for narrower bandwidths.

The second object of this invention is to provide a design that can be inexpensively manufactured. Inexpensive manufacture is afforded because of a simple, unique and easily constructed assembly of layered optics that provides micro optic construction detail required to perform polarization separation and conversion without the requirement for precise half wavelength retarder plates. No precise wavelength dimensions are required for the layers, only restricting the birefringent layer to as thin as possible relative to the other layer to avoid input losses. Similarly, the birefringent layer does not require precise orientation, but can be randomly oriented.

The third object of this invention is to provide an electromagnetic radiation polarization converter that can be manufactured from a wide range of materials allowing inexpensive materials and or rugged materials able to withstand a chosen environment. The invention may be constructed from a wide range of materials that include mineral crystals such as mica, quartz, calcite, or polymer materials such as optical Mylar and other polymers. Therefore, the optic may be designed to withstand the environment, for example high temperature, or low cost.

The fourth object of this invention is to provide a polarization converter that can be used on many applications. This invention applies to a wide range of applications requiring polarized light such as LCD projectors, fiber optics communications, and applications such as linear polarization of headlight illumination to 45 degrees. The invention can be manufactured of a form with flat entrance and exit surface apertures, curved, or doubly curved while maintaining a low volume. The invention can be manufactured as a small component for applications restricting size. This invention can be manufactured to convert wide bandwidths or narrow bandwidths at very high efficiency.

BRIEF DESCRIPTION OF THE DRAWINGS

The nature of this invention is to convert electromagnetic radiation into a selected polarization state. This invention provides significant advantages for many applications requiring polarized electromagnetic radiation. The present invention can be clearly understood from the following descriptions of the preferred embodiments in conjunction with the accompanying drawings, wherein.

DETAILED DESCRIPTION OF THE INVENTION

Figure 1:
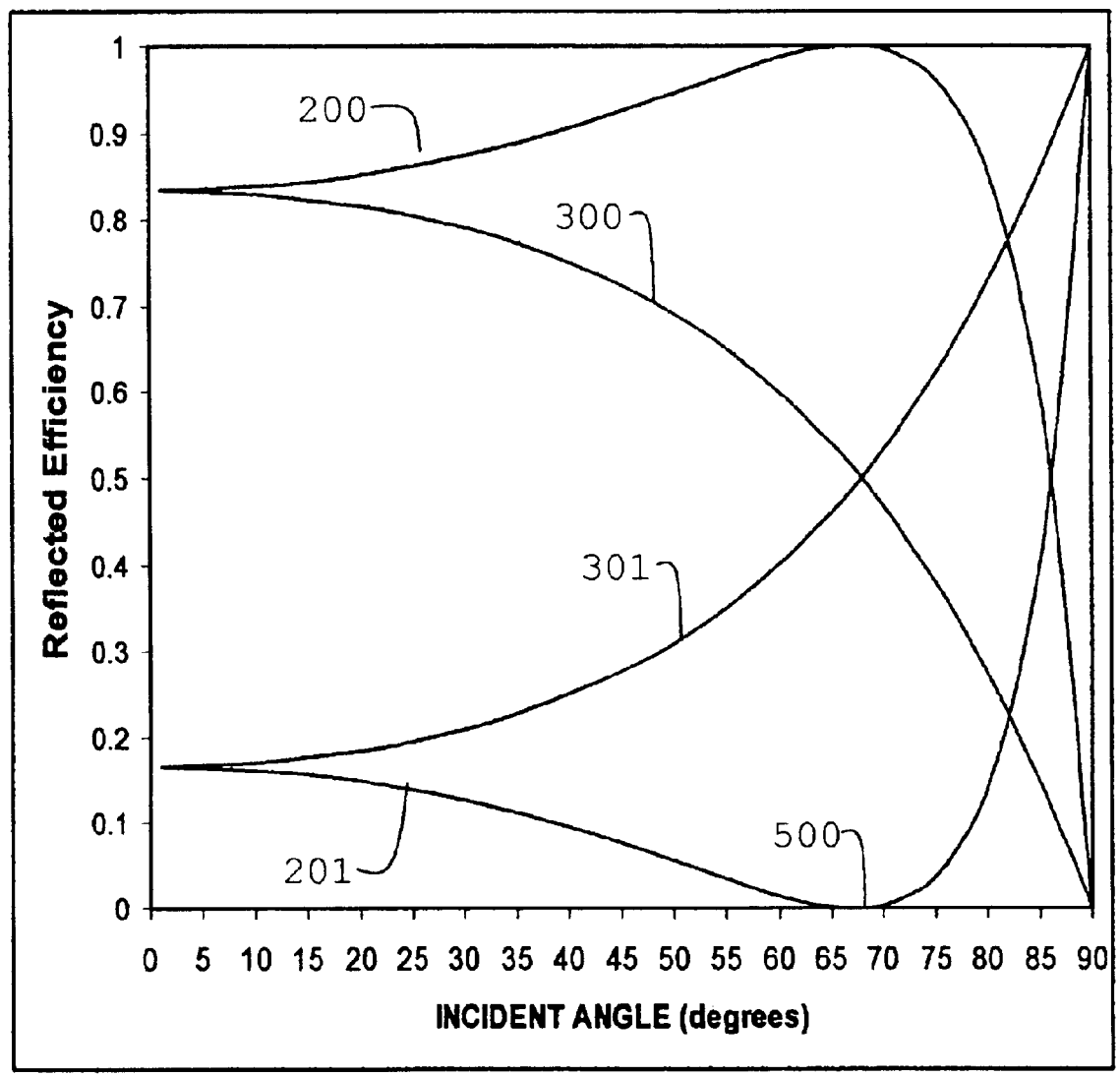
FIG. 1 is a graph showing the physics of reflection and refraction of the two orthogonal linear polarizations impinging on a dielectric surface versus incident angle.

FIG. 1 Detailed Description

FIG. 1 shows graphs of the transmission and reflection coefficients from zero to 90 degrees incident angle as measured from a reference orthogonal to the dielectric surface, for the two orthogonal linearly polarized components available in unpolarized electromagnetic radiation. The equations are presented by Jefimenko, "Electricity and Magnetism," pages 546–547. In the FIG. 1 example, the incident index of refraction is set at one as expected for air, and 2.378 for the dielectric translucent layer consistent with wurzite.

FIG. 1 shows the electromagnetic radiation reflection, 200, and transmission coefficients, 201, for radiation with the electric field vector at an angle to the dielectric surface. The second pair of parametric curves, 300 and 301 shows the reflection and transmission coefficients for electromagnetic radiation whose electric field vector is parallel to the dielectric surface. It is instructive to note that the reflection and transmission coefficients are a function of all the following: the incident angles, the polarization, the index of refractions, and the difference between the two index of refractions. Brewster's angle identified by 500 is the critical angle in which all of the electromagnetic radiation with the electric field vector at an angle to the dielectric is refracted into the dielectric.

One half of the incident light is composed of an electric field vector vertical to the surface and is represented by the sum of 200 and 201. The other 50% of the incident light is represented by the electric field vector horizontal to the plane of the surface and is represented as the sum of 300 and 301. This graph is very key to understanding the performance of this invention and its discriminator to the prior art. The prior art typically aligns the birefringent optic to Brewster's angle shown as 500 in FIG. 1. At Brewster's angle, the two polarization components, each representing one half of the unpolarized electromagnetic radiation are reflected and refracted 100%; however, subsequent conversion of one polarization is only 50%. FIG. 1 shows that the reflection of the mutually orthogonal components of unpolarized radiation is a function of incident angle. This invention uniquely utilizes the principles shown in FIG. 1 by providing greater polarization conversion efficiencies at angles greater than Brewster's angle, with an optimum angle in the range of 85 degrees. The advantages provides are greater wideband performance because the thickness and orientation of the birefringent rotating layer is not critical as in the prior art which requires a half wave plate thickness. Higher efficiencies are possible because multiple reflection refraction and polarization rotation interactions are afforded.

Figure 2:
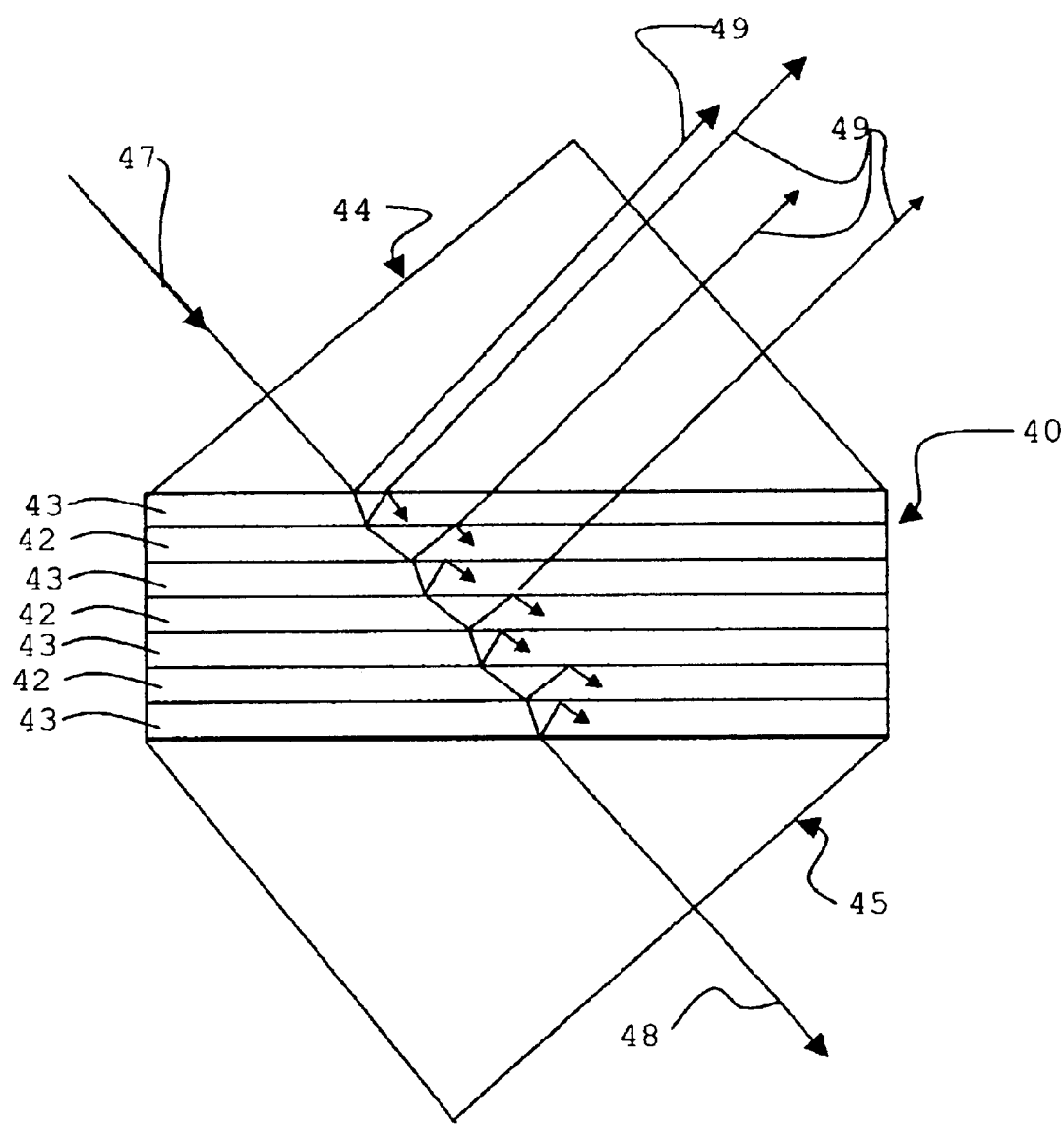
FIG. 2 is a drawing showing the prior art MacNeille prism.

FIG. 2 Detailed Description

FIG. 2 shows the prior art MacNeille prism, 40. The MacNeille prism is constructed by alternating layers of translucent dielectric materials shown as 42 and 43. The materials are selected in part for the greatest difference in the index of refractions and consequent polarization separation properties. A third and fourth dielectric shown as 44 and 45 are positioned and selected to partially compromise between Brewsters angular requirements and convenient angles for radiation through the entrance and exit apertures, identified as entrance radiation 47 and exit radiation, 48; thus, a compromise between two conflicting requirements. The dielectric layers 43 and 42, are positioned at Brewsters angle in order to transmit the electromagnetic field polarization whose electric field vector is at an angle to the surface of the layer, and reflect the other polarization. MacNeilles prism functions to separate the two orthogonal polarizations and output two orthogonal linear polarizations, 48 and 49, which are 99.5% pure.

This invention, described in the following figures, is similar in physical construction to the MacNeille prism. This invention is different from the MacNeille prism because it deletes items 44 and 45, and creates the entrance and exit apertures by cutting layers 43 and 42 at an angle perpendicular to incident radiation, 47 and exit radiation, 48. The edges of 43 and 42 become the entrance and exit apertures.

FIG. 3 Detailed Description

Figure 3A:
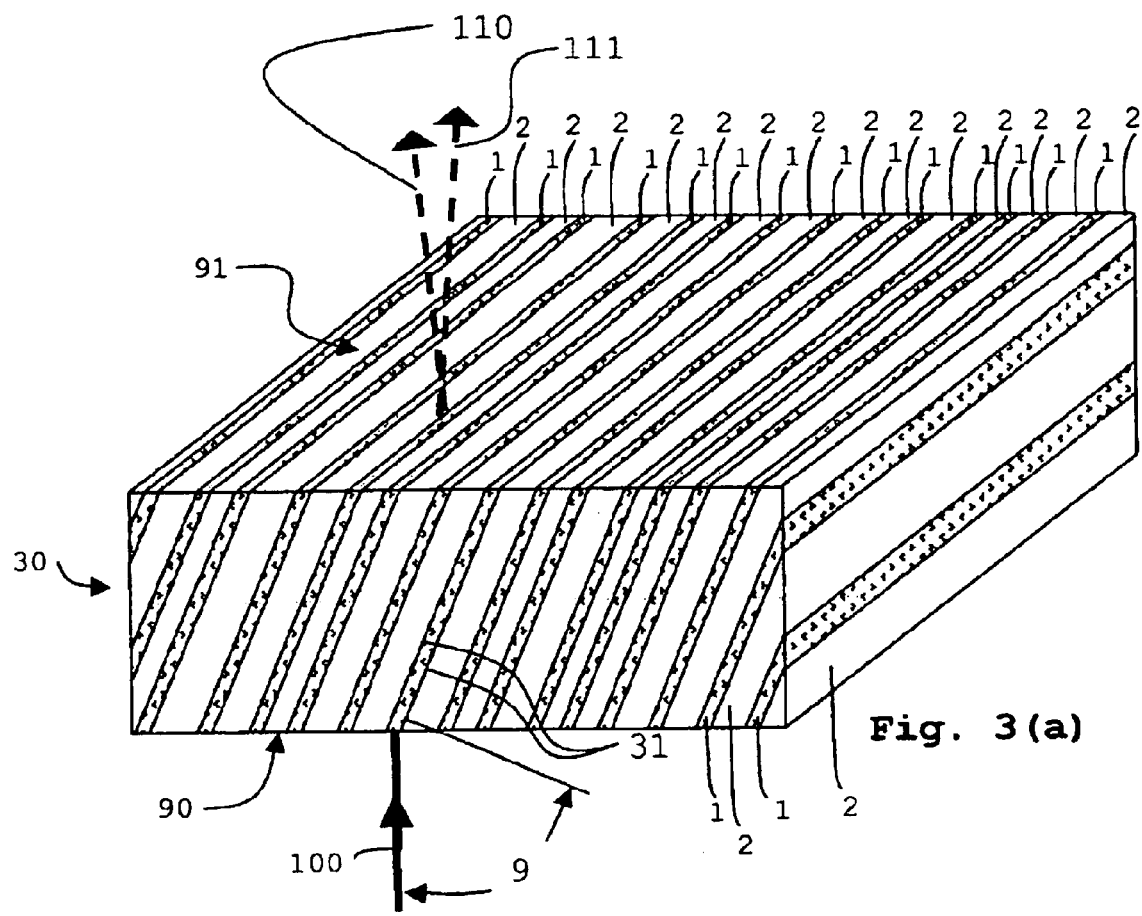
FIG. 3 is an isometric drawing showing the preferred wide band embodiment physical construction concept.
Figure 3B:
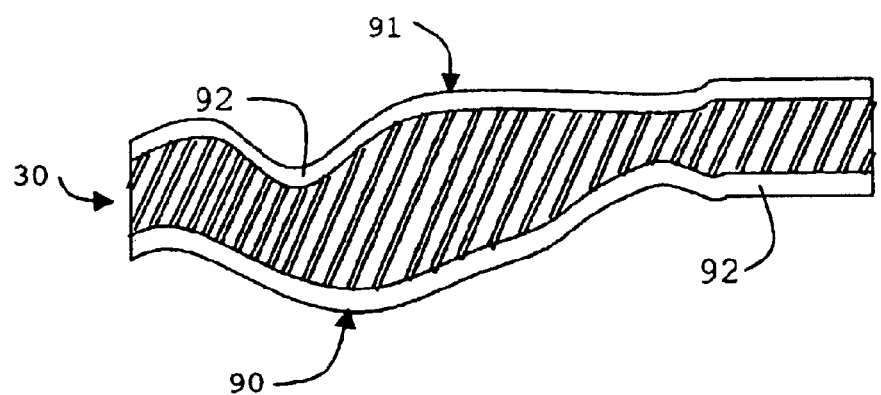

FIG. 3 shows the wide band preferred embodiment construction. The optic, 30, is composed of alternating layers 1 and 2. The layers labeled 1 are selected in the most simple terms for the preferred embodiment as an birefringent cement. Layer 1 can be any translucent birefringent material that acts as a polarization randomizer. Examples of birefringent materials are: birefringent polymers, and mineral crystals such as calcite, quartz and wurzite. Layer 1 can also be formed by a polarization scattering material with a high index of refraction. However, a polarization scattering material is not preferred because scattering changes the directions of the radiation paths transiting layer 1 causing a corresponding divergence increase. The layers labeled 2 are selected to be a low index of refraction. Both layers are selected for low attenuation. The layers 1 and 2 are positioned at an angle 9 relative to a collimated radiation input 100. The angle 9 is drawn at a smaller angle in order to show the reflection refraction details. Actual angles will be approximately 85 degrees, but will vary depending on the selection of materials for layers 1 and 2. The actual angled layers 1 and 2 would appear almost vertical in the isometric if drawn at 85 degrees. Layer 1 is selected thin, unlike drawn, because the percentage of the incident radiation impinging directly on optic aperture 90 and on the edges of the 1 layer is treated as a energy loss. Note that the output radiation shown by 110 and 111 diverges. The divergence is also shown exaggerated by the nature of showing an exaggerated cant for layers 1 and 2. The divergence is a function of the angle of layers 1 and 2 with respect to input radiation 100, and selected index of refractions. Reducing the thickness of layers 1 and 2 reduces the total thickness of the optic, and provides for the desired number of reflection refraction interactions on surfaces 31. Apertures 90 and 91 may also be treated with special anti reflective coatings or filters, as demanded by the design application. The major aperture surfaces, 90 and 91, are shown flat in FIG. 3(a); however, these surfaces may be curved or doubly curved to fit a particular geometrical requirement such as an automobile headlight cover as shown in FIG. 3(b). Layer 1 can be selected to be any birefringent material such as a birefringent polymer or minerals such as calcite, quartz and many other minerals. Layer 2 can also be selected as low index of refraction cement. A possible design is high index of refraction cement between layers 1 and 2, wherein layer 1 is selected to be of birefringent capability, providing a combination of a third layer where the high index is optimized by the cement and the birefringent capability is selected for birefringence and other design reasons such as cost or temperature properties. Metallic coatings also offer higher index of refractions, allowing for a design wherein layer 1 or 2 are coated with a high index of refraction coating to enhance Malus's selective polarization reflection refraction. All layers can be treated with constructive destructive coatings to enhance performance; however, the cost of manufacture is increased.

Figure 4:
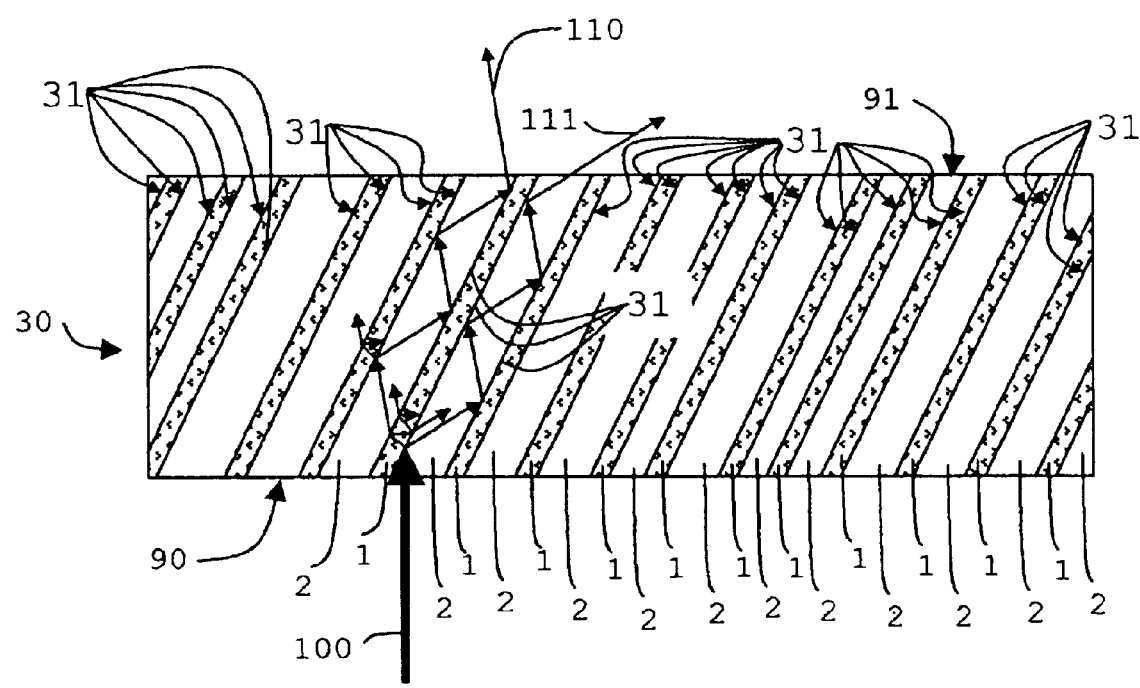
FIG. 4 shows a cross section of this invention and how the light is internally reflected, refracted and converted.

FIG. 4 Detailed Description

FIG. 4 is a cross section of the polarization converter optic, 30 that shows details of the reflections and refractions according to Snell's law. The angular cant is also exaggerated in FIG. 4 in order to show the electromagnetic interaction within the optic 30. The incident, collimated, unpolarized radiation, 100, enters aperture 90, and is selectively reflected and refracted by layers 1 and 2. The polarization component with the electric field vector parallel to surfaces 31 transiting from layer 2 are favored for reflection, while the orthogonal component is favored for refraction into layer 1. Layer 1 is composed of birefringent cement material. The high index of refraction difference between layer 1 and 2 causes higher selective differences between reflection and refraction of the two orthogonal linear radiation components of electromagnetic radiation in accordance with Malus's law. The birefringent or polarization scattering material acts to rotate the refracted electric field vectors, partially converting the polarization electric field vectors at an angle to interface 31 to a polarization electric field vector parallel to surface 31. The radiation entering layer 1 was initially richer in polarization with the electric field vectors at an angle to the layers because of the action of Malus's law. The radiation refraction out of layer 1 back into layer 2 has been partially converted to the desired polarization. Subsequent multiple reflections off of interface 31 repeat the cycle and further act to favor polarization whose electric field vector is parallel to the surfaces 31 in accordance with Malus's law. The radiation refracts out of layer 1, then reflects and refracts off of surface 31 repeating the cycle of favoring a single polarization during reflection, and favoring the orthogonal polarization for refraction and polarization conversion by the birefringent material. Thus, the input radiation 100 is separated through multiple reflections and converted to the desired polarization output to cascade through the layered optical guide of layer 2 and exit as 110 and 111 through aperture 91. The divergence between 110 and 111 is a function of the angular cant of layers 1 and 2 with respect to the incident radiation, 100. Layer 1 exhibits different indices of refraction for the two orthogonal linear polarizations, causing the two polarizations to slightly diverge upon exit. However, the residual unconverted polarization is unwanted. Ten reflection refraction interactions as counted in layer 1 are quite adequate, with very little improvement available after ten interactions. In the example, the layers 31 are selected as parallel; however, oblique angles can be used to modify the divergence between 110 and 111.

The variables providing significant improvement to conversion efficiency are first, the selected angle of layers 1 and 2 with respect to incident radiation 100 and second, a higher difference between the indices of refraction between layers 1 and 2.

FIG. 5 Detailed Description

Figure 5A:
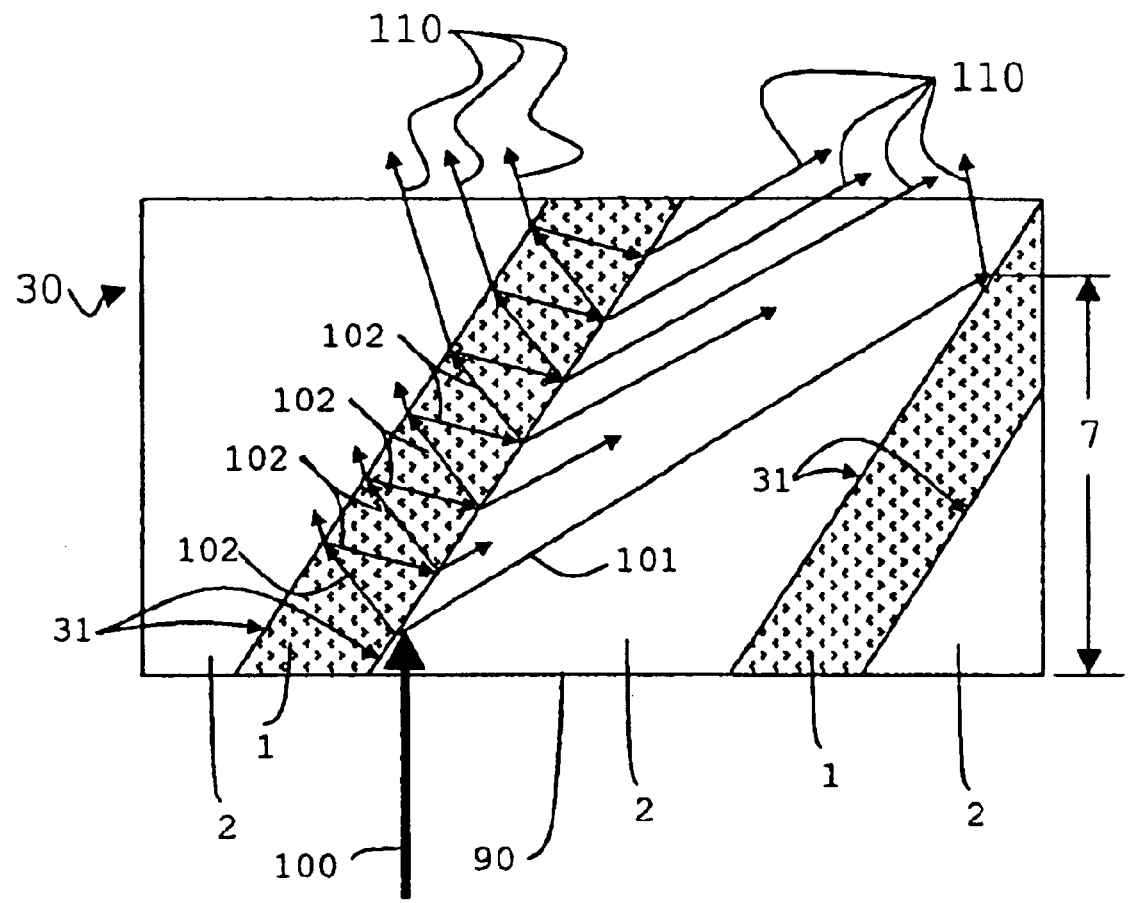
FIG. 5 shows how multiple reflections occur in the two layers.

FIG. 5(a) shows expanded reflection and refraction detail. The incident electromagnetic radiation 100 enters through aperture 90 into layer 2. The incident radiation 100 impinging on surface 31 is both reflected and refracted. Note that the number of reflections and refractions is doubled each time one interaction occurs. The interactions proceed as a geometric progression. The reflected component 101 travels a major distance, 7, in optic 30, before again impinging on another surface 31. The refracted component of 100 shown as 102 has a much steeper angle of incidence because of the higher index of refraction selected for layer 1. Multiple reflections also occur internal to layer 1 as compared to layer 2 because layer 1 is thinner with higher index of refraction causing higher refraction by the 102 ray traces as compared to 101 ray traces. The result of the multiple reflections refractions is to have most of the energy refracting back into layer 2 prior to a single reflection refraction interaction in layer 1. As a result, the electromagnetic radiation, 102, reflecting inside of layer 1, and shown as 102 in FIG. 5(a), has many opportunities to exit layer 1 before approaching the same depth, 7, as compared to ray trace 101. If layer 1 is selected to be one-tenth the thickness of layer 2, typically 39 reflection opportunities exist internal to layer 1 before the accumulative reflected radiation path length reaches depth 7. Note that a single reflected path length in layer 1, shown as 7, is much shorter than the reflected ray trace 102. Therefore, most of the electro magnetic radiation refracts out of layer 1 back into layer 2 prior to achieving the same depth, 7, in optic 30. Note in FIG. 5 a and b, multiple output ray traces, 110, not all shown, are created at each refraction reflection interaction on surfaces 31.

Figure 5B:
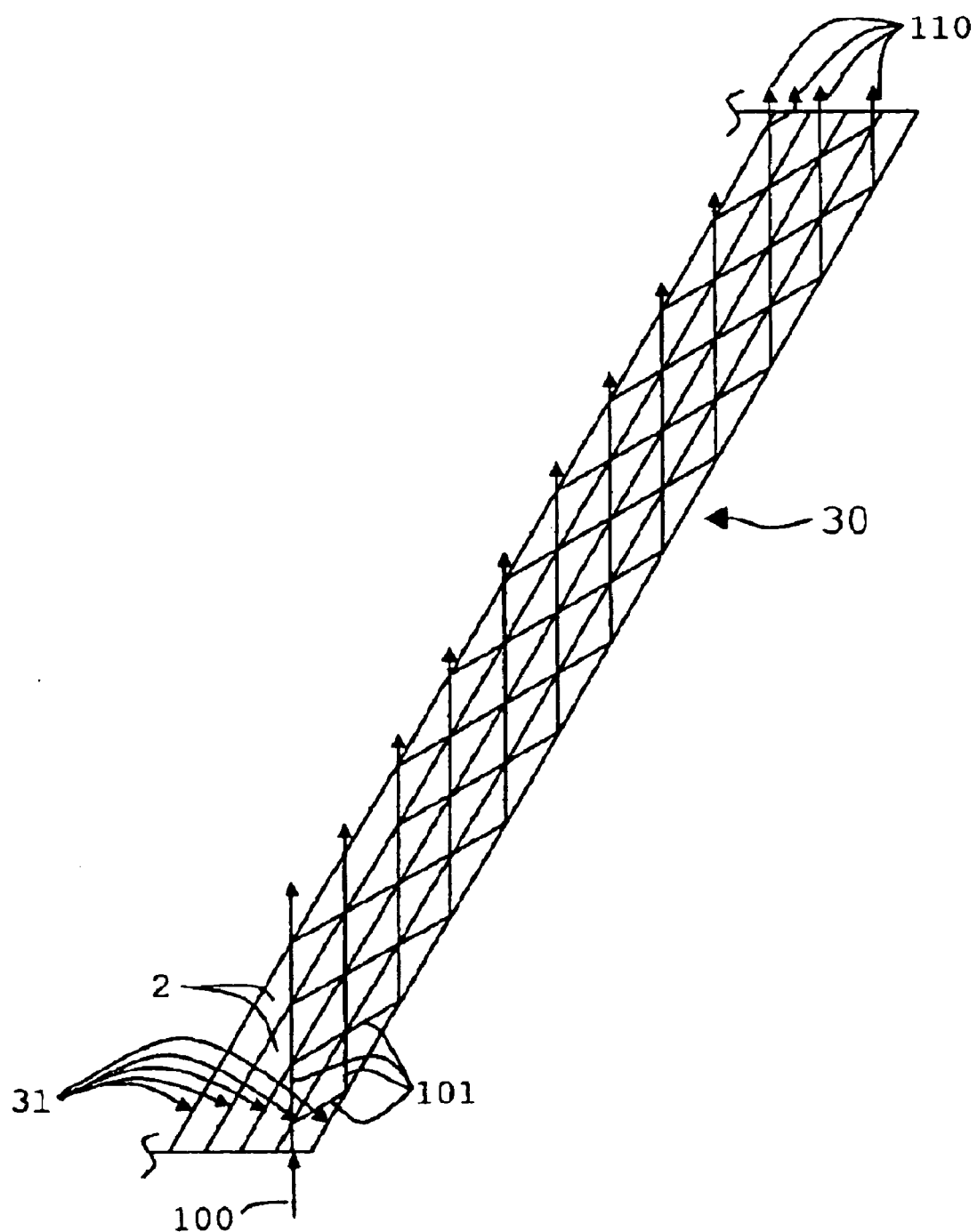

FIG. 5(b) shows incident radiation 100 entering optic 30 with resultant multiple reflection interactions to ray 101 on a surface, 31 in layer 2. The actual wide band preferred embodiment is constructed optimally of a thickness to allow approximately ten such interactions.

Figure 6:
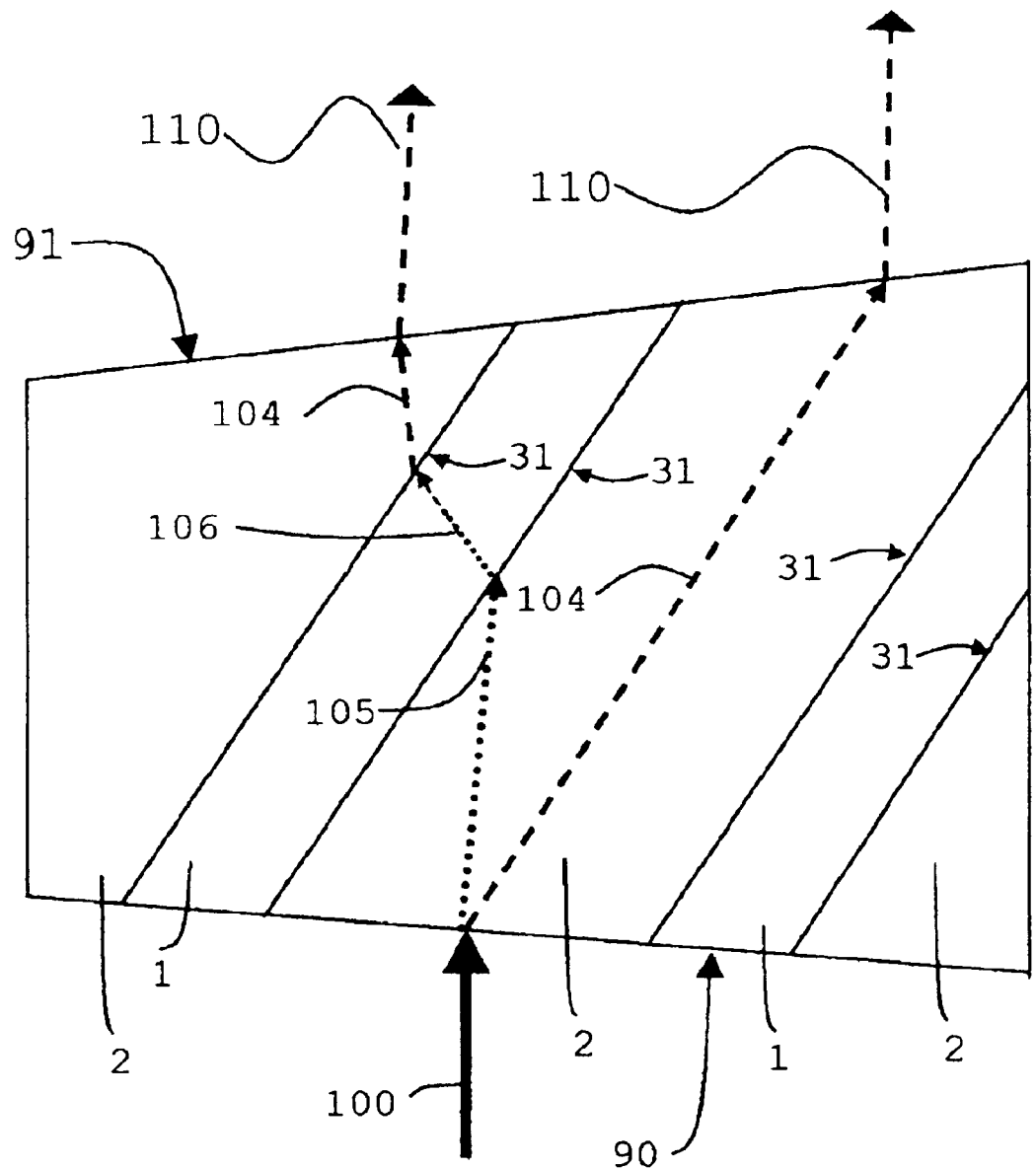
FIG. 6 shows a narrow band preferred embodiment wherein both layers are of birefringent material.

FIG. 6 Detailed Description

FIG. 6 shows a preferred narrow band embodiment in which layers 1 and 2 are each composed of birefringent materials. The cement fixing the layers together is not shown, although one or both layers may be constructed of a birefringent cement. Incident unpolarized radiation 100 enters the surface 90 at an oblique angle to cause the two polarized orthogonal components of the incident electromagnetic radiation, 100, to be in accordance with Snell's law refracted into two components, 104 and 105, which are linear polarized electromagnetic radiation orthogonal to each other. The layer 2 birefringent crystal is positioned with entrance aperture geometrically set at an angle in accordance with Snell's law to cause ray 104 to refract an angle near parallel to the interface surfaces between 1 and 2, identified by 31, minimizing further reflections from surface 31 by ray 104 in layer 2. Layer 2 is to act as a ray guide for exiting ray 104. Layer 1 is selected to be a birefringent phase rotator so that the path length of 106 causes a 90-degree electric field phase rotation, converting the ray 106 to be polarized as a ray 104 upon exit refraction into the adjacent layer 2. The ray 104 exiting layer 1 is a linear polarized ray of the same polarization as the refracted ray derived directly from the incident ray 100 at entrance aperture surface 90. The exiting rays 110 are all of the same polarization. Note that the two exiting rays may not be parallel, but may have some divergence dependent on the variables selected for angular cant of surfaces 90 and 91 both relative to incident radiation 100, and the indices of refraction for layers 1 and 2. The index of refraction for layer 1 can be selected to compensate for the different refraction paths to minimize divergence between the two exiting rays 110. Output aperture surface, 91, is shown at an angle selected in accordance with Snell's law to cause output radiation 110 to refract parallel to input radiation 100; however, the exit aperture surface need not be canted.

The preferred narrow band embodiment shown in FIG. 6 is quite thin in depth compared to the wideband embodiment because fewer than three interactions of ray 105 are required to provide high efficiency. FIG. 5 shows only one interaction.

A variation of the design is to tilt the optic slightly rather than provide the canted surface 90. Other variations such as high index of refraction adhesives or high index metallic coatings can be applied to improve performance.

Figure 7:
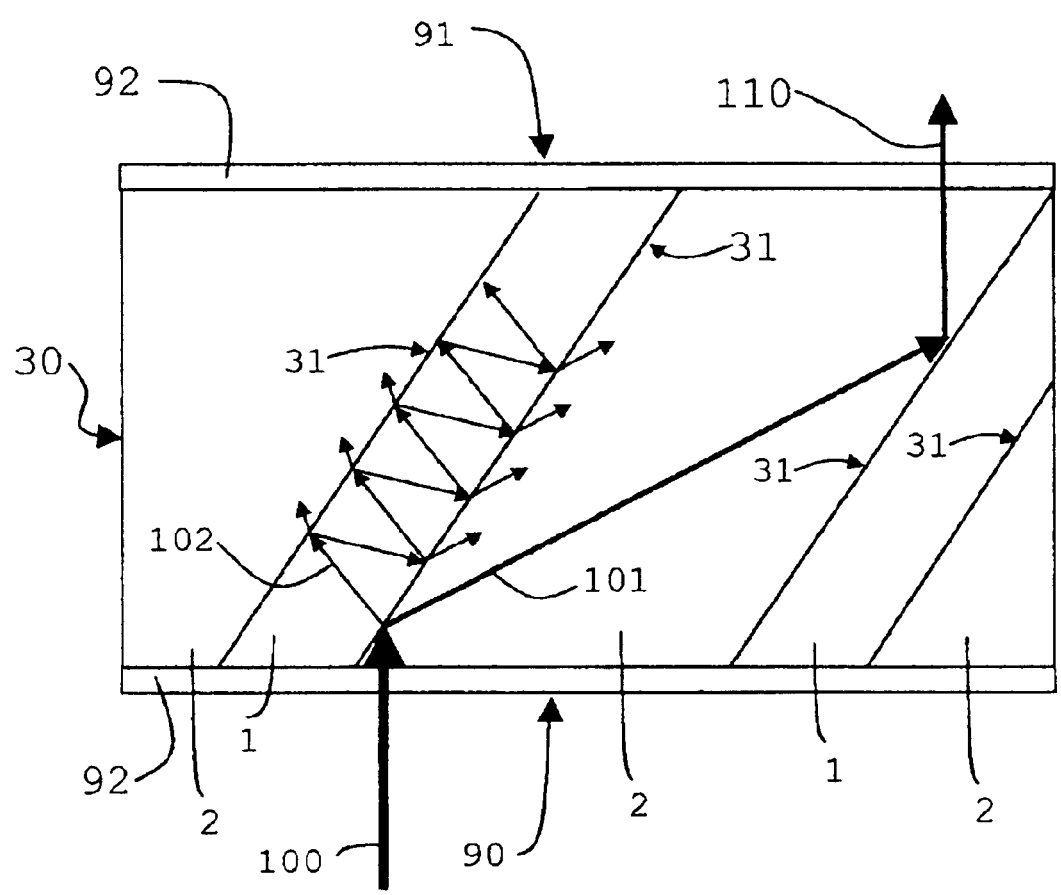
FIG. 7 shows a variation of the wide band preferred embodiment wherein a layer is composed of air or a gas.

FIG. 7 Detailed Description

Figure 8:
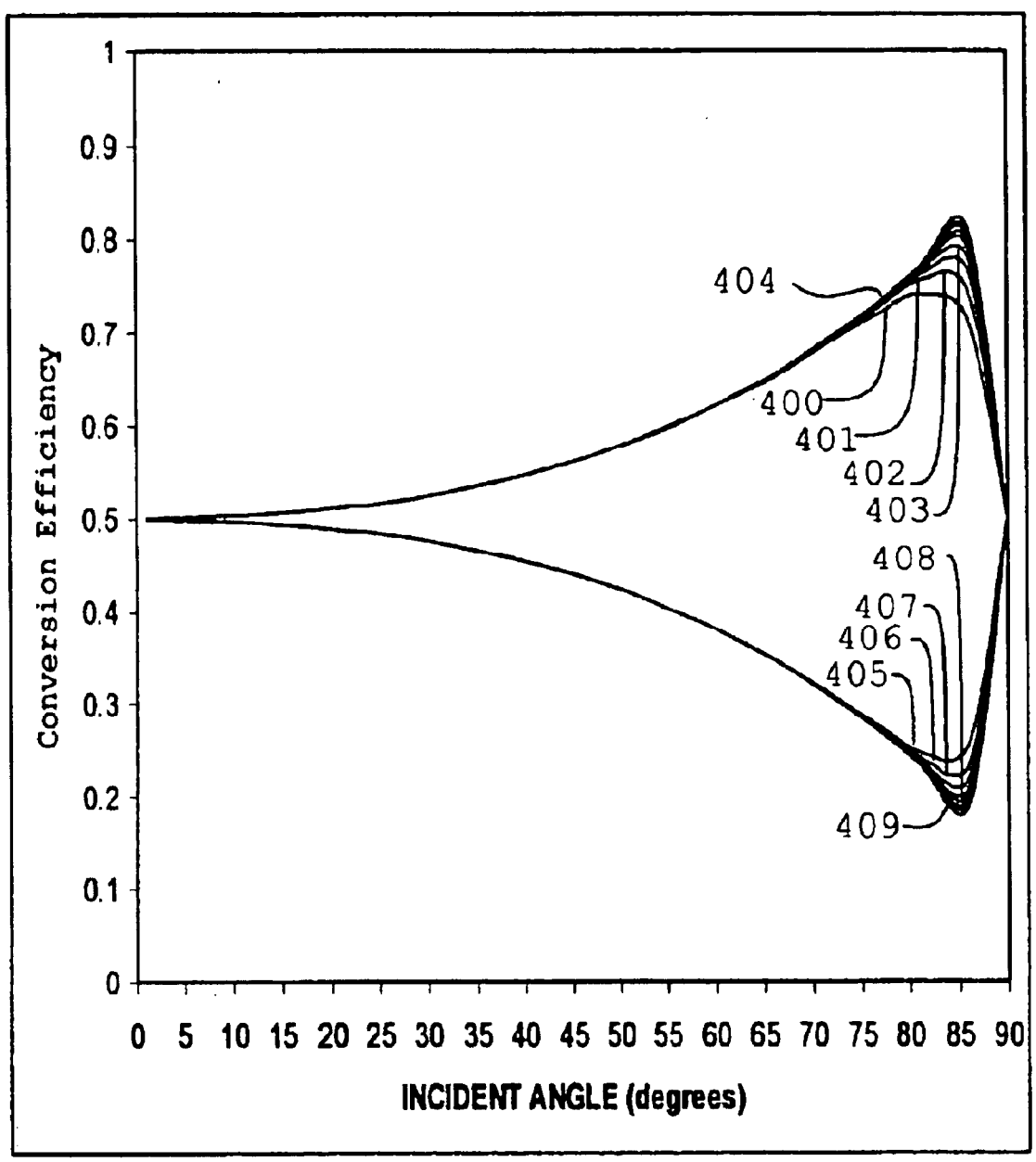
FIG. 8 is a parametric showing the conversion efficiency performance of electromagnetic radiation conversion for the wide band preferred embodiment.

FIG. 7 shows a variation of the wide band embodiment presented in FIG. 3 wherein layer 2 is air or a gas. Other arrangements such as spacers between layers 1 are also possible. In the example shown in FIG. 7, the structure is arranged in a such a manner that layer 1 is a birefringent material. The layers 1 are held in place by two end layers 92. Adhesive cement is not shown. Incident radiation 100 is shown entering through entrance aperture 90, transiting through the plate, 92, and reflecting off of surface 31 into a partially linear polarized ray 101, while the orthogonal component is shown as 102 refracting into layer 1 and suffering multiple reflections and polarization rotations in layer 1 before refracting into the layer 2 air gap. Only two reflections of the preferred polarization radiation 101 are shown for simplicity of drawing. Ray 110 is shown exiting the optic 30 through exit aperture 91. The actual optic 30 should be constructed to allow at least ten reflections of ray 101 from surface 31 in order to sufficiently convert the incident radiation 100 to the desired output polarization 110. FIG. 8 parametric is an example of this embodiment using wurzite for layer 1.

FIG. 8 Detailed Description

FIG. 8 is an example of a basic parametric showing efficiency of the embodiment described in FIG. 7. The parametric allows the selection of the number of optic layer sets to process the radiation, and the optimum angle the layer sets are angled, with respect to the input radiation angle. Graphs 400, 401, 402, 403 and 404 show the conversion efficiency for different numbers of layer sets for linearly polarized radiation with electric field vectors in the plane of interface 31 shown in FIG. 7. Graphs 405, 406, 407, 408 and 409 show the conversion efficiency for different numbers of layer sets for linearly polarized radiation with electric field vector at an angle to the interface 31 shown in FIG. 7. The parametric determines the optimum angle for layers 1 and 2, layer sets, shown in FIG. 7, with respect to entrance radiation angle 100 in FIG. 7, and a reasonable number of layer sets required to process the radiation to desired polarization purity. FIG. 7 shows only one layer reflection refraction processing. The FIG. 8 parametric selects indices of refraction for the layers shown in FIG. 7 to be 1.0, consistent with air, and 2.378 consistent with wurzite. Improved performance is easily achieved by increasing the difference between the two indices of refraction. FIG. 8 shows polarization conversion efficiency versus incident angle as measured from orthogonal to the layer surfaces, as identified as 31 in FIG. 7. Items 400, 401, 402, 403 and 404 represent conversion efficiency coefficients of input radiation that has been converted to linear polarization with the electric field vector parallel to the interface 31 as shown in FIG. 7. The FIG. 8 parametric shows conversion efficiency, 400, for an optic constructed with three sets of layers; 401 shows an optic with four layer sets; 402 shows an optic with five layer sets, 403 six layer sets. Item 404 shows layers seven through ten and layers 20 and 30 as superimposed, indicating very little improvement in polarization conversion after ten layers; however, there is a measurable improvement with the higher number of layers. The most effective parameter improving the efficiency is a high index of refraction difference between layers 1 and 2 as earlier identified and shown in FIG. 7. A high index of refraction adhesive with birefringent properties offers better performance. A good design is to select a very high index of refraction adhesive, and mix birefringent materials in the adhesive, because the birefringent material may be a constituent of the adhesive.

Items 405, 406, 407, 408 and 409 show the conversion coefficient for the original input radiation that is not converted. Note that 408 corresponds to 403, and the sum of incident electro magnetic radiation must equal the sum of 400 and 405 for three layers, neglecting absorption. Similarly, the sum of 406 and 401 must equal the incident radiation. The maximum efficiency is shown to be at about 87 degrees.

Figure 9:
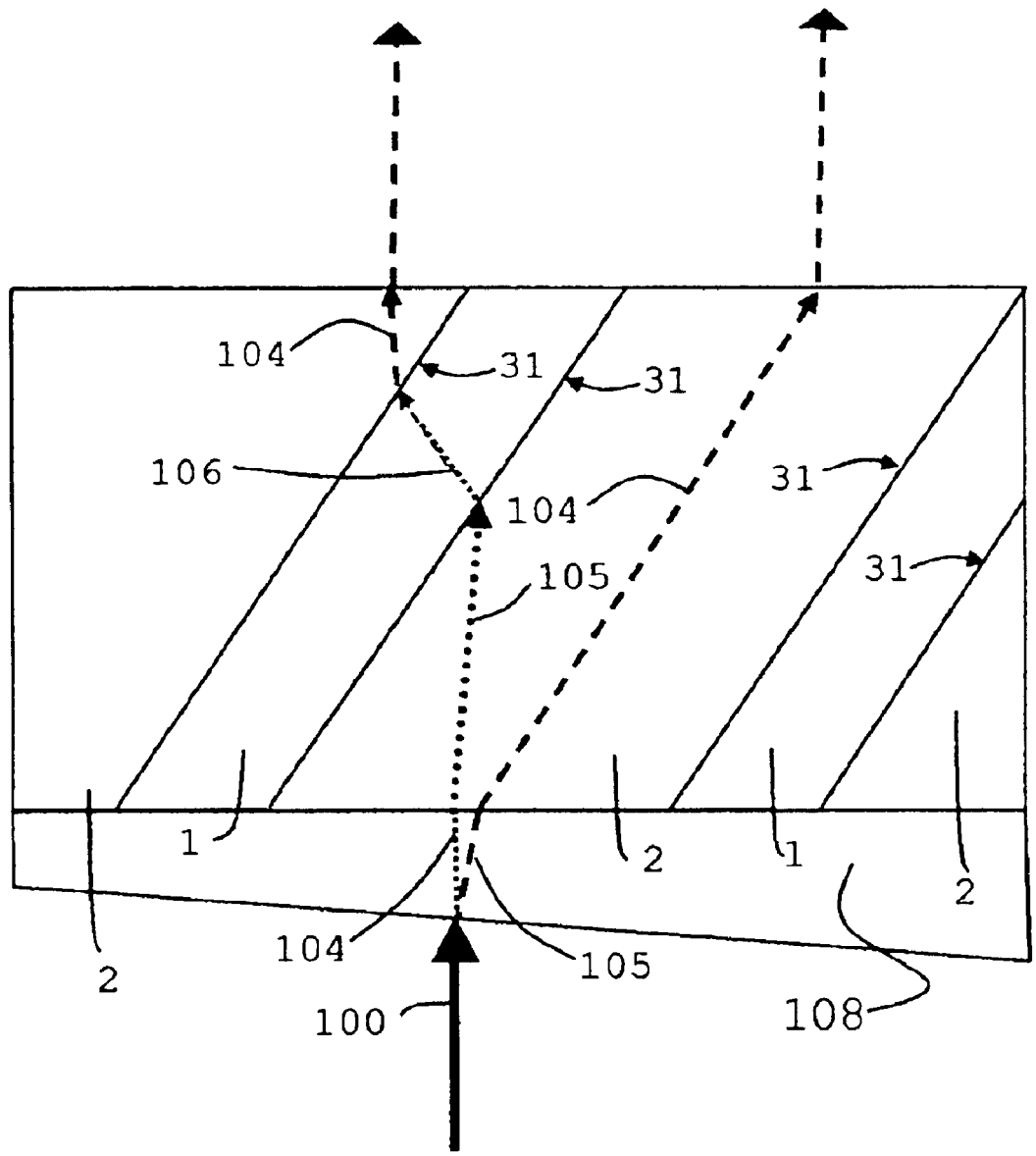
FIG. 9 is a variation of the narrow band preferred embodiment wherein an input aperture is a layer of birefringent material.

FIG. 9 Detailed Description

FIG. 9 shows an addition of an optical element 108, applicable to both the wide band and narrow band embodiments. Incident unpolarized ray 100 is shown entering a birefringent material 108, whose entrance aperture is canted in a manner to cause incident radiation 100, to refract in accordance with Snell's law. The birefringent material causes two radiation components 104 and 105 to refract along different angular paths because of the birefringent properties of different indices of refraction for the two orthogonal electric field vectors.

For the narrow band application, the angles and birefringent materials for both 108 and layer 2 are selected to cause the path 104 inside layer 2 to be near parallel to the interfaces 31 in order to minimize reflections from surface 31. The angles and birefringent materials for both 108 and layer 2 are also selected to cause the radiation path 105 inside layer 2 to impinge on layer 1. A compromise is required between these two conflicting requirements. In the case of the narrow band converter, path length 106 is chosen to act as a 90-degree phase rotator. Note that fewer layers are required to convert the radiation to polarized radiation.

For the wide band application, layer 1 may be non birefringent, and layer 1 radiation path length shown by 106 need only act as a partial converter. The wideband application will require multiple layers to optimize conversion.

Figure 10:
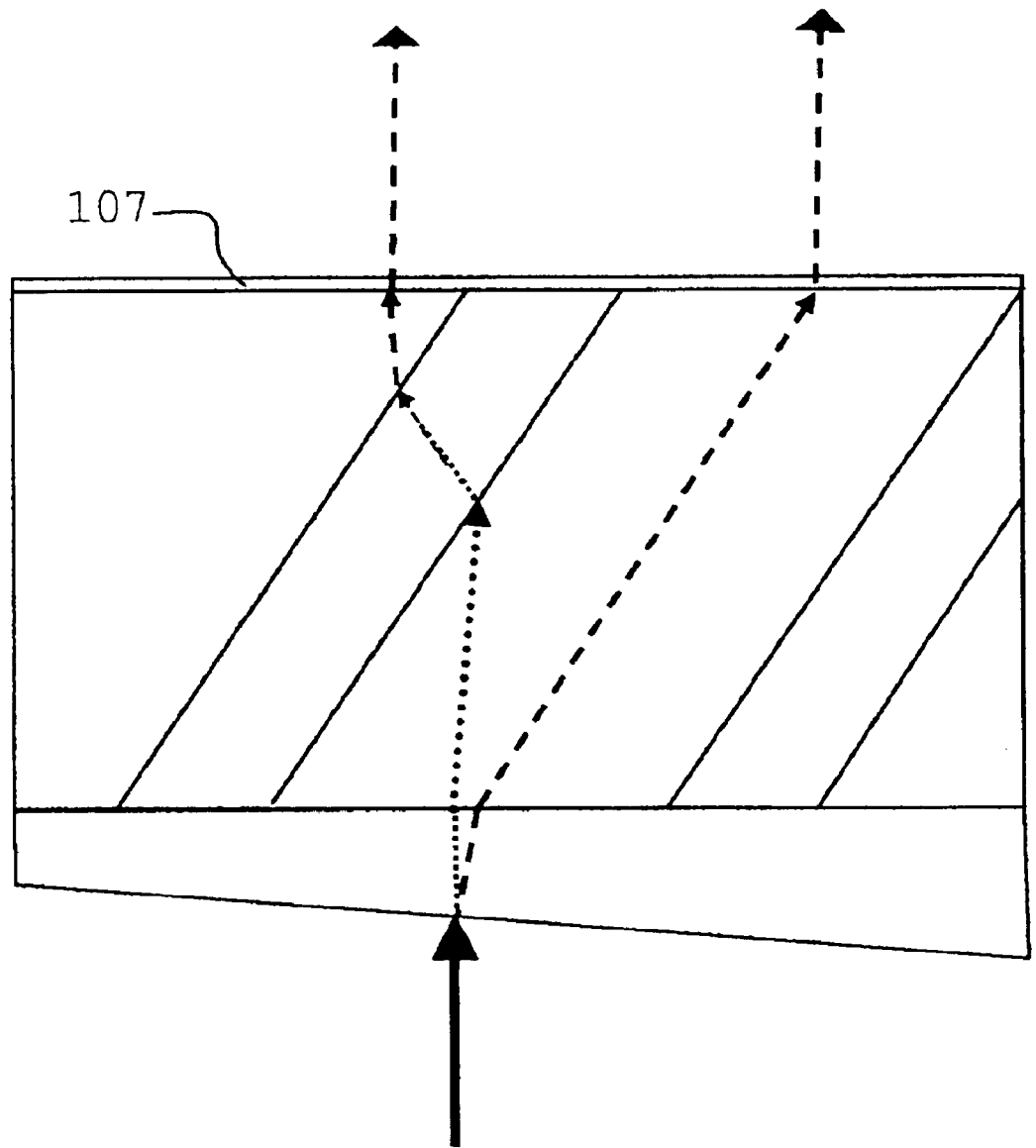
FIG. 10 shows a feature wherein a birefringent layer at the output produces elliptical or circular polarization.

FIG. 10 Detailed Description

FIG. 10 shows the addition of a phase rotator or mirror reflector positioned over the output aperture. The addition of 107 is applicable to either the wide band or narrow band converter; however, shown as an example to the narrow band configuration. The phase rotator may be a quarter wave plate of proper thickness as specified by the law of constructive destructive interference and properly situated to cause output circular polarization as the design application demands. Elliptical output polarization may be achieved with proper selection of the wave plate thickness. The phase rotator exit layer, 107 can be applied to any combination of the designs presented. The layer 107 may also be made of a reflective polarization mirror film, in order to provide a high extinction ratio for the linear polarization output.

The above descriptions are illustrative examples of single embodiments of the polarization converter. Any modifications or amendments, which may be achieved by those skilled in the art, are within the scope and spirit of the present invention. Any combinations, which differ from the examples given, are within the scope and spirit of the present invention. The scope of the invention is defined by the claims.

What is claimed is:

1. A polarization converter for converting electromagnetic radiation from a source into electromagnetic radiation having a prescribed polarized radiation state, said radiation source providing electromagnetic radiation resolvable into two mutually orthogonal linear polarization states, comprising:

a plurality of alternating layers, the plurality of alternating layers including at least two layer types,
one layer type having at least one of birefringence or polarization scattering capability, and having at least one high refractive index as compared to the other layer types,
and one layer type without birefringence and with low refractive index as compared to the other layer types,
the alternating layers having a high refractive index and birefringence and/or polarization scattering capability being adjacent at least one non birefringent layer of low refractive index in an alternating arrangement of layer types defining boundaries between the layer types, the boundaries being arranged at an angle with respect to incoming electromagnetic radiation such that both reflection and refraction occurs at the boundaries,
wherein one linear polarization state is preferentially reflected at the interface between layer types,
wherein the orthogonal polarization state is preferentially refracted at the said interface,
one edge of each alternating layer being adjacent at an input aperture, the input aperture thus comprising a series of adjacent micro-optic input apertures, each defined by a cross-section of an alternating layer at the input aperture,
one other edge of each of alternating layer also being adjacent an exit aperture, the exit aperture thus comprising a series of adjacent micro-optic exit apertures, each defined by a cross-section of a layer at the exit aperture,
wherein at least one said alternating layer is thinner than the other alternating layers, and is made of birefringent material or polarization scattering material, so as to partially rotate or randomize the electric field radiation vectors therein, and to refract said radiation out of a major side of said at least one layer into an adjacent layer,
wherein said low and high refractive indices are related so as to cause separation, reflection, refraction, and channeling of said two polarization states, and
wherein at least one layer is a radiation conduit favoring reflection of a selected polarization state and transmitting radiation to the exit aperture while maintaining said polarization state,
wherein at least one layer is a radiation polarization converter causing refracted radiation to be of randomized electric field radiation vectors, and to refract said radiation out of a major side of a birefringent layer into an adjacent non birefringent layer,
wherein at least one layer of high refractive index material with birefringence and/or polarization scattering capability and oriented with respect birefringent effects so as to rotate electric field radiation vectors relative to a desired polarization state, with said layer thickness not necessarily being constrained by the criterion for half wavelength retardation,
wherein the said angled boundaries are angled at greater angles than Brewster's angle with respect to incident radiation utilizing multiple reflection-refraction interactions at each boundary, the sum of multiple interactions providing higher conversion efficiency than available with orientation at Brewster's angle with one,
wherein said conversion efficiency is dependent on the number of reflection-refraction interactions, so selected by the number of interacting layers and distance between entrance and exit apertures, and is independent of the criterion for half wave retardation,
wherein said polarization converter uses a plurality of sets of at least one non birefringent layer layered between at least one birefringent layer without the need for an additional precisely positioned micro array of birefringent rotators at the exit aperture or internal to the optic.

2. The polarization converter of claim 1, further wherein said input and exit apertures each have a surface form which is bounded by parallel or non-parallel sides and which is at least one of flat, curved, or doubly curved, and the form of each aperture is independent of the form of the opposite aperture.

3. The polarization converter of claim 1, wherein at least one of said alternating layers also acts as an adhesive between said layers.

4. The polarization converter of claim 1, further comprising a plate or layer situated at the output aperture of the sum of the micro-optic exit apertures to cause selective polarization rotation of the output radiation electric field vector, so as to provide output radiation which is circularly or elliptically polarized.

5. The polarization converter of claim 1, further comprising one layer situated at the sum of the micro-optic exit apertures constituting the output optic major aperture to cause selective polarization reflection of the output radiation and to increase the degree of polarization of the output radiation.

6. The polarization converter of claim 1, wherein a plate or layer of birefringent material is situated over a common entrance aperture shared by at least one non birefringent layer type and at least one birefringent or polarization scattering layer type so as to cause input radiation to be separated into two components, one of which components is directed for conversion by one of the birefringent or polarization scattering layers and the other component is directed to a layer type acting as a radiation guide to the exit aperture.

7. The polarization converter of claim 1, wherein at least one high refractive index layer comprises a birefringent material dispersed in an optical adhesive of high refractive index.

8. A narrow band polarization converter for converting electromagnetic radiation from a source into electromagnetic radiation having a prescribed polarized radiation state, said radiation source providing electromagnetic radiation resolvable into a two mutually orthogonal linear polarization states, comprising:

a plurality of alternating layers, the plurality of alternating layers including at least two layer types, one layer type having at least one of birefringence and high refractive index as compared to the other layer types, and one layer type without birefringence and with low refractive index as compared to the other layer types, the alternating layers having a high refractive index and at least one layer of low refractive index in an alternating arrangement of layer types, with at least two layer types set at an angle relative to the incident radiation to cause selective reflection-refraction separation of the two orthogonal linear polarization states, wherein one linear polarization state is preferentially reflected at an interface between layer types, wherein the orthogonal polarization state is preferentially refracted at the said interface, one edge of each alternating layer being adjacent at an input aperture, the input aperture thus comprising a series of adjacent micro-optic input apertures, each defined by a cross-section of an alternating layer at the input aperture, one other edge of each of alternating layer also being adjacent an exit aperture, the output aperture thus comprising a series of adjacent micro-optic exit apertures, each defined by a cross-section of a layer at the output aperture, wherein at least one said alternating layer is thinner than the other alternating layers, and is made of birefringent material to rotate the electric field vector approximately 90 degrees and to refract said radiation out of a major side of said at least one layer into an adjacent layer, wherein said low and high refractive indices are related so as to cause separation, reflection, refraction, and channeling of said two polarization states, and wherein at least one layer is a radiation conduit favoring reflection of a selected polarization state and transmitting radiation to the exit aperture while maintaining said polarization state, wherein the layer types are spatially arranged to be at angles greater than Brewster's law with respect to incident, and wherein the distance between the input and exit apertures is selected to provide more than one reflection-refraction separation within a single layer.

9. The polarization converter of claim 8, further wherein the input and exit apertures have a surface form which is bounded by parallel or non-parallel sides, and which is one of flat, curved, or doubly curved, the surface form of each aperture being independent of the surface form of the other aperture.

10. The polarization converter of claim 8, wherein at least one of said layers also acts as an adhesive between said layers.

11. The polarization converter of claim 8, further comprising a plate or layer situated at the collective exit apertures to cause selective polarization rotation of the output radiation electric field vector so as to provide output radiation which is circularly or elliptically polarized.

12. The polarization converter of claim 8, further comprising one layer situated at the collective exit apertures to cause selective polarization reflection of the undesirable output radiation, and to increase the degree of polarization of the output radiation.

13. Polarization converter of claim 8, further comprising a plate or layer of birefringent material situated over the input aperture to cause input radiation to be separated causing one component to be directed for conversion and the other polarization component to be directed to a layer radiation guide for output.

* * * * *